ROY HAHN INVENTOR

BY Merrill M. Blackburn
ATTORNEY

Patented Nov. 4, 1930

1,780,820

UNITED STATES PATENT OFFICE

ROY HAHN, OF PLEASANT VALLEY, IOWA, ASSIGNOR OF ONE-HALF TO WILLIAM LEESE

VEGETABLE TOPPER

Application filed April 4, 1927. Serial No. 180,738.

My present invention pertains broadly to vegetable harvesters and more particularly to machines for topping vegetables before they are removed from the ground, this machine being designed primarily to remove the tops from onions before they are harvested but being capable of use also in connection with other crops, by a proper adjustment of the parts thereof. While I have designed harvesting machinery to be used in conjunction with the present apparatus for removing the vegetables from the ground concurrently with the topping thereof, I have confined the present disclosure to the topping mechanism which will presently be described.

Among the objects of my invention are to provide mechanism adapted for the raising of the fallen tops of onions and cutting same from the bodies thereof; to provide mechanism of the character indicated suitable for the topping of onions; to provide mechanism of the character indicated which can be adjusted to various heights from the surface of the ground over which the machine is being propelled; to provide a machine which will lift the tops of onions from the ground, after they have fallen, and carry them up to a cutting mechanism where they will be severed from the bodies thereof; to provide a simple and efficient machine for the purpose indicated; and such further objects, advantages and capabilities as will hereafter appear and as are inherent in the construction disclosed. My invention further resides in the combination, construction and arrangement of parts illustrated in the accompanying drawing and, while I have shown therein a preferred embodiment of this invention, I desire the same to be understood as illustrative only and not as limiting said invention.

Figure 1:
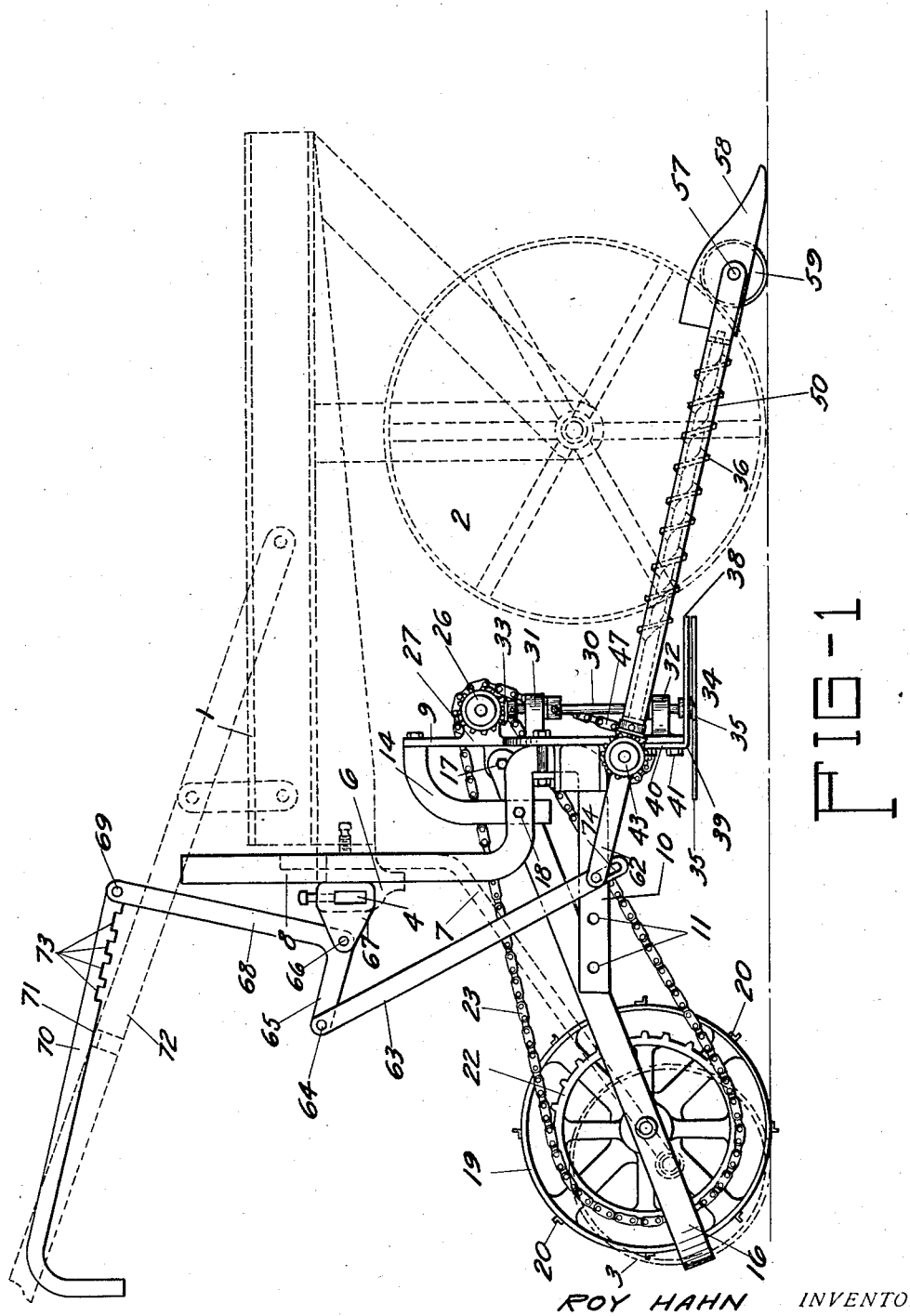
Figure 2:
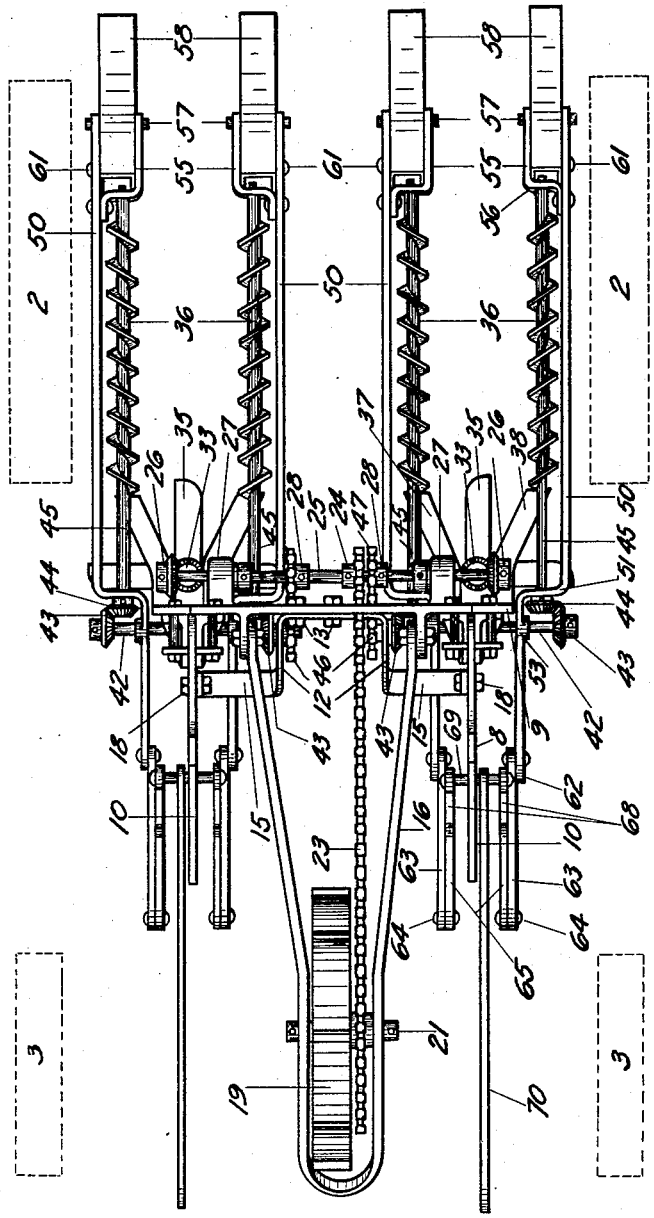
Figure 3:
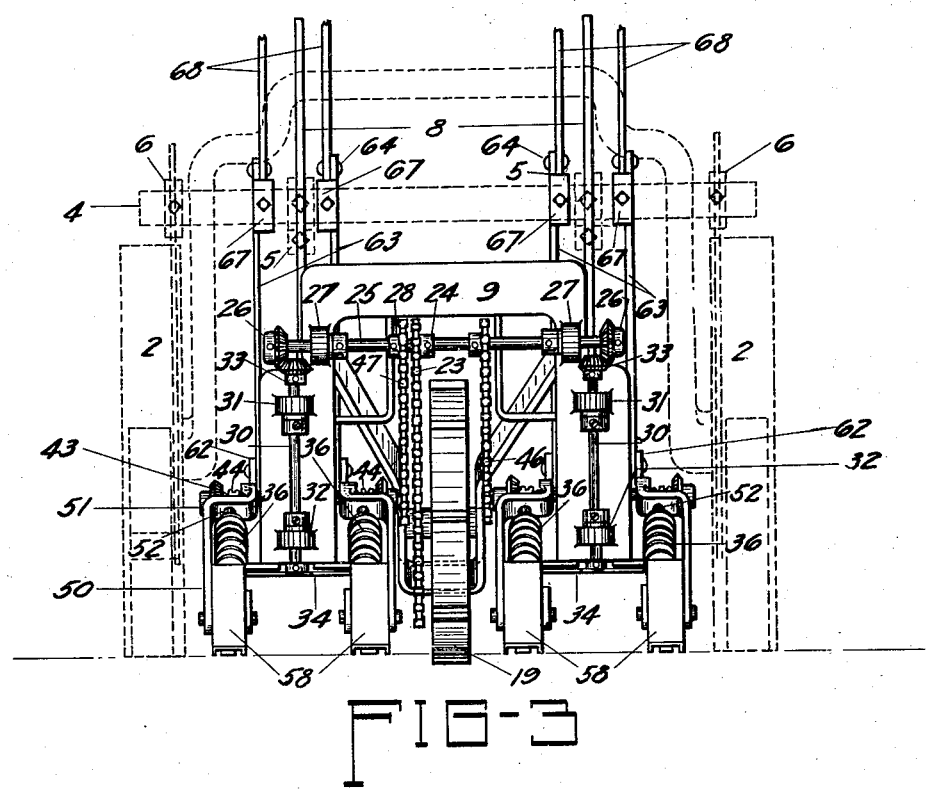
Figure 4:
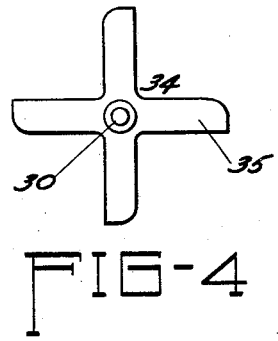
Figure 6:
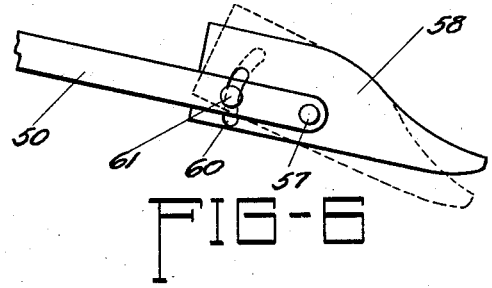
Figure 5:
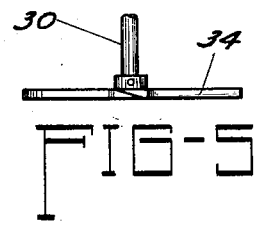

In the annexed drawings, Fig. 1 discloses in solid lines a side elevation of my construction applied to a well-known form of tractor; Fig. 2 shows a plan view of my device and indicates the position thereof with relation to the driving wheels of the tractor; Fig. 3 is a front elevation of the structure shown in Figs. 1 and 2; Fig. 4 is a plan view of a cutter element designed to sever the vegetable tops from the bodies; Fig. 5 is an elevation of the structure shown in Fig. 4; and Fig. 6 is a fragmentary view showing the possibility of adjusting the top-lifting shoes of the elevating mechanism.

Referring more in detail to the annexed drawings numeral 1 denotes in general a tractor to which my device is adapted to be attached for the purpose indicated and numerals 2 and 3 denote respectively the driving wheels and the rear and sustaining wheels of this tractor. Forming a part of the framework of the tractor is a cross bar 4 upon which are mounted various clamps 5, 6 and 67. In two of these clamps on opposite sides of the tractor are mounted bent bars 7 which carry stub axles on which are mounted the wheels 3. These bars 7 and wheels 3 serve to sustain the rear portion of the tractor and prevent the same from falling.

The clamps 5 mounted on and adjustable along the bar 4 have the angular bars 8 clamped therein, the same being adjustable both vertically and transversely to properly position the mechanism. These bars 8 extend forwardly into contact with the rear side of the yoke plate or frame 9, then downwardly along the back side of this plate and rearwardly as indicated at 10 to serve as supporting means for the harvester mechanism, for the attachment of which holes 11 are provided. A bar 12 is secured at 13 to the back side of the plate 9 and then extends rearwardly and downwardly as indicated at 14 in Fig. 1 and then laterally as indicated at 15, Fig. 2, to serve as supporting means for the drive wheel carrying yoke or frame 16. This yoke is pivoted at 17 but is prevented from dropping down when the rear of the tractor is lifted by reason of the fact that it engages the horizontal parts 15 of bar 12, the extremities of which are secured by bolts 18 or the like, indicated more clearly in Fig. 2. The parts 8, 9, 10, 12 and 15 constitute a framework to be attached to the power unit or tractor and to carry the other parts of my apparatus.

A drive wheel, or trailer wheel, 19 provided with ground engaging lugs 20 is pivoted upon an axle 21 passing through the yoke 16 which constitutes a framework for the trailer wheel 19. A sprocket wheel 22 is connected rigidly with the ground wheel 19 and serves as a driving means for the sprocket chain 23. This chain passes over a smaller sprocket 24 and thus serves as driving means for the shaft 25 carrying at its ends the bevel gears 26. This shaft passes through bearings in lugs 27 carried on the forward side of plate 9 and has other sprocket wheels 28 secured thereto, for a purpose to be presently described. Vertical shafts 30 are carried in bearings in lugs 31 and 32 on the front side of the plate 9. These shafts 30 have at their upper ends bevel gears 33 which mesh with the gears 26 to cause rotation of the shafts 30, which shafts carry adjacent their lower ends cutting heads 34 shown clearly in Figs. 4 and 5. As shown in Fig. 5 the blades of the cutter head are sharpened at their forward edges to serve as cutting means for the vegetable tops. The blades of these cutter heads may be either integral with the hubs or may be secured thereto by rivets or other suitable means. However, it is believed preferable to have these blades detachable so that in event one of them gets broken or too badly bent to be of further service it may be removed and a new one substituted without the necessity of replacing the whole cutter head. I prefer to use four of these cutter blades or arms 35 though any suitable number may be used. It will be observed that these cutter heads are driven in opposite directions and therefore cause the tops to be cut in the direction of the outside of the machine so that they will have more of a tendency to go toward the outside of the machine than toward the middle thereof. A pair of guide and cutter bars 37 and 38 is provided for each cutter head 34 to receive the tops from the screws 36 and guide them toward the cutter heads. These cutter bars are bent as indicated at 39 to have a vertical part 40 secured by bolts 41 to the lower end of the U plate 9. These bars are therefore readily removable in event they become injured or for other reasons it is desirable to remove them.

Shafts 42 passing through bearings in lugs upon the rear side of plate 9 carry at their opposite ends bevel gears 43 to mesh with corresponding bevel gears 44 upon the rear extremities of the shafts 45 of screws 36. Sprocket wheels 46 are mounted adjacent the inner ends of the shafts 42 and are connected in driving relation with the sprockets 28 by means of sprocket chains 47. The shafts 25 and 42 may be extended and have the sprockets 28 and 46 mounted outside of the gears 43 and bars 50. It will be seen that as the ground wheel 19 turns, during the advancement of the topper over the ground, the sprocket chain 23 will cause rotation of the shaft 25 and this will in turn cause rotation of the shafts 42 and 30. Rotation of the shafts 42 causes rotation of the shafts 45 and consequently the screws 36. Therefore, as the tops come into engagement with the screws 36 they will be carried along these oppositely rotating screws until they come into the path of the rotating cutter heads 34 when they will be severed from the vegetables themselves and will drop over the sides of the top lifters out of the way of the rest of the machinery. The top lifters comprise the screws 36, bars 50 and shoes 58, with their associated parts.

Bars 50, bent laterally at 51 are perforated at 52 for the passage of the shafts 45 and therefore serve as a bearing for the rear ends of those shafts. These bars are then bent rearwardly and are provided with perforated heads 53 through which the shafts 42 pass. It will therefore be seen that the bars 58 can be turned about the shafts 42 without disconnecting the gears 43 and 44 or placing any strain thereon. This is important as it is sometimes advisable to raise the top lifters from the ground and it is also necessary that these be capable of rising and falling with any unevenness in the ground so that they shall constantly come in contact with the surface of the field during operation.

Brackets 55 are secured to the sides of the bars 50, as indicated most clearly in Fig. 2, and are perforated at 56 to furnish a bearing for one end of shafts 45. The arms 50 and brackets 55 are perforated adjacent their ends for the reception of the axles 57 upon which are carried the shoes 58. Inside of these shoes and on the axles 57 are supporting wheels 59 upon which the forward ends of these top lifters are carried. By preference, one side of each shoe 58 is slotted as indicated at 60 and a bolt 61 passes through the slot and through the bar 50 and is held in adjusted position by a wing nut or any other equivalent fastening means upon the inside of the shoes. This makes it possible to secure a considerable range of adjustment as indicated in Fig. 6. However, there is ordinarily not a great deal of adjustment required for these shoes as they can be set at the factory at the substantially correct angle. If it should be thought desirable, the wheels 59 can have bevel gears or other suitable driving mechanisms connected therewith inside of the shoes 58 and can be used to operate the shafts 45, instead of the means provided. However, there are serious objections to this and I prefer to use the method of driving here disclosed. It is also desirable to have means connected with each of the lifters whereby they can be raised from contact with the ground when turning corners. This can readily be provided in the form of an extension of each of the bars 50 rearwardly of the shafts 42 as shown at 62. They can be arranged to be operated simultaneously or independently as thought desirable.

Links 63 may be pivotally connected to the extensions 62 of the bars 50 and may also be pivotally connected at 64 with the arm 65 of the bell-crank lever mounted pivotally at 66 upon the bracket 67 carried by the cross bar 4. The other arm 68 of the bell-crank lever is pivotally connected at 69 with the handle 70 for purposes of operation. A cross bar 71 connects the handles 72 of the tractor and notches 73 are provided in the lower edges of the arms 70 to engage with this cross bar 71 when the handles 70 are pulled backwardly to raise the top lifters. It will be understood that when the handles 70 are pulled backwardly the bell-cranks 68, 65 will be turned upon their pivots 66 and links 63 will be shoved downwardly to push the extensions 62 downwardly and raise the forward ends of the top lifters. When it is desired to again lower these top lifters, it is only necessary to raise the handles 70 and the weight of the lifters will cause them to drop into contact with the ground. As indicated above, it is desirable to be able to raise these top lifters when turning corners and at other times. This mechanism will very satisfactorily accomplish that purpose.

Slots 74 are provided to permit the top lifters to rise and fall with the unevenness of the ground without the necessity of moving parts 63 to 70.

The bar 4 and brackets 67 shown in Figs. 1 and 3 have been omitted from Fig. 2 in order not to confuse the disclosure by reason of the large number of lines which it would be necessary to have in the vicinity and just rearwardly of pivots 69. It is mentioned here that dotted lines are used to indicate the positions of various parts of the tractor which is, itself, old, and that solid lines are used to indicate my new construction, which is used with this tractor.

I have designed various other mechanisms for accomplishing the same result as that accomplished by the mechanism disclosed in this application and it is therefore to be understood that this disclosure is merely typical and that the specific description of structure set forth above may be departed from without departing from the spirit of my invention as set forth in this specification and the appended claims.

Having now described my invention, I claim:

1. In a vegetable topper, a supporting framework, a pair of relatively angularly disposed guide bars carried by said framework, a shaft carried by the framework and extending between the guide bars, a cutter head carried by and rotating with said shaft in a horizontal direction and cooperating with the guide bars in cutting vegetable tops, means to cause actuation of said shaft and head, and means to elevate vegetable tops and deliver them between the guide bars in position to be severed by the cutting head, the actuating means for the shaft including a trailer wheel and a frame in which the wheel is mounted, said frame being pivoted adjacent one end on the supporting framework to move vertically and follow the contour of the ground.

2. In a structure of the character indicated, a supporting framework, guide bars carried thereby in a position to have vegetable tops delivered between them to be severed from the vegetables, operating means carried by the framework, a cutter adjacent the guide bars and adapted to cooperate with said guide bars to sever vegetable tops from the bodies when the tops are delivered between the guide bars, top lifters having ground engaging shoes to lift the vegetable tops from the ground, screws to receive the tops from the shoes and advance them along the top lifters as the machine is advanced along the ground, and operative connections with the driving mechanism for rotating the screws for the purpose stated.

3. In a vegetable harvester, a topping mechanism comprising a supporting framework and means to movably support the same above the ground, a top severing mechanism supported by the framework, driving means therefor, a frame element movably connected to the framework, a drive wheel mounted therein, a driving connection from the drive wheel to said driving means, a top lifter adapted to raise vegetable tops and move them along the lifter as the machine advances toward the vegetables, and driving connections for operating the lifter to cause the tops to move along the lifter as it advances.

4. In an onion topper, a framework to be attached to a power unit, a substantially vertical shaft carried by the framework, arms carried by the shaft and rotating in a substantially horizontal plane, said arms having the forward edges thereof sharpened to serve as cutting means to sever onion tops from the the bodies remaining in the ground, guide bars carried by the framework adjacent the said arms and cooperating therewith in the severing of onion tops from the bodies, at the same time leaving the bodies in the ground, a framework pivoted adjacent one end to the first named framework to move up and down with the unevenness of the ground, and a trailer wheel mounted in and rotatable in the second named framework and having driving connection with said vertical shaft.

5. In an onion topper, a framework to be attached to a power unit, a frame pivotally connected thereto and carrying a driving wheel, the pivotal connection of said frame permitting the wheel to move in an arc of a circle about the connection of the frame to the framework, a sprocket carried by the wheel co-axially therewith, a shaft, carrying a second sprocket, mounted in said framework adjacent the pivotal connection, a drive chain connecting the sprockets operatively, the location of the parts permitting the frame to turn about its pivot and still keep the chain reasonably tight so that it will be prevented from becoming accidentally detached from the sprockets.

6. In an onion topper, a framework to be attached to a power unit, a frame pivotally connected thereto to swing in a substantially vertical plane, said frame carrying means to engage the ground and furnish motive power by reason of such engagement and movement along the ground, a shaft in the framework adjacent the pivot of the frame and substantially parallel to the axis thereof, connections between said ground engaging means and said shaft whereby the latter may be driven by the former, a screw to elevate vegetable tops, a shaft to drive said screw, driving connections between the aforesaid shafts, and means for manually turning the screw about the second named shaft to raise the screw from the ground.

In witness whereof, I hereunto subscribe my name to this specification.

ROY HAHN.